United States Patent
Orensteen et al.

(10) Patent No.: US 10,509,148 B2
(45) Date of Patent: *Dec. 17, 2019

(54) IRRADIATION MARKING OF RETROREFLECTIVE SHEETING

(71) Applicant: 3M INNOVATIVE PROPERTIES COMPANY, St. Paul, MN (US)

(72) Inventors: Bruce D. Orensteen, St. Paul, MN (US); Robert Leland Wee Smithson, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,834

(22) Filed: Aug. 23, 2018

(65) Prior Publication Data

US 2019/0011613 A1    Jan. 10, 2019

Related U.S. Application Data

(63) Continuation of application No. 13/509,222, filed as application No. PCT/US2010/056259 on Nov. 10, 2010, now Pat. No. 10,082,609.

(60) Provisional application No. 61/260,550, filed on Nov. 12, 2009.

(51) Int. Cl.
*G02B 5/12* (2006.01)
*G02B 5/124* (2006.01)
*G09F 13/16* (2006.01)
*B60R 13/10* (2006.01)

(52) U.S. Cl.
CPC ............ *G02B 5/124* (2013.01); *G09F 13/16* (2013.01); *B60R 13/10* (2013.01)

(58) Field of Classification Search
None
See application file for complete search history.

(56) References Cited

U.S. PATENT DOCUMENTS

| | | | |
|---|---|---|---|
| 4,588,258 A | 5/1986 | Hoopman | |
| 4,634,220 A | 1/1987 | Hockert | |
| 4,645,301 A | 2/1987 | Orensteen | |
| 4,708,920 A | 11/1987 | Orensteen | |
| 4,714,656 A | 12/1987 | Bradshaw | |
| 5,156,863 A | 10/1992 | Pricone | |
| 5,691,846 A | 11/1997 | Benson, Jr. | |
| 6,843,571 B2 | 1/2005 | Sewall | |
| 7,068,434 B2 | 6/2006 | Florczak | |
| 10,082,609 B2 * | 9/2018 | Orensteen | G09F 13/16 |
| 2001/0026860 A1 | 10/2001 | Benson et al. | |
| 2005/0200961 A1 | 9/2005 | Rosenbluh | |
| 2005/0258637 A1 | 11/2005 | Bi | |
| 2008/0012162 A1 | 1/2008 | Chapman | |

(Continued)

FOREIGN PATENT DOCUMENTS

| WO | WO 96/30786 | 10/1996 |
|---|---|---|
| WO | WO 1999/23516 | 5/1999 |
| WO | WO 2008-011279 | 1/2008 |

*Primary Examiner* — Jennifer D. Carruth

(57) ABSTRACT

A method of marking prismatic retroreflective sheeting includes providing prismatic retroreflective sheeting having a front side and a back side, the back side having prismatic features and directing a radiation source at the back side of the prismatic retroreflective sheeting and irradiating a plurality of the prismatic features. The radiation forms a mark in the prismatic retroreflective sheeting.

6 Claims, 1 Drawing Sheet

(56) References Cited

U.S. PATENT DOCUMENTS

2008/0212181 A1    9/2008   Wu
2009/0142486 A1    6/2009   Hannington
2010/0103521 A1    4/2010   Smith
2017/0197338 A1*  7/2017   Martinez ................. B29C 33/42
2018/0364403 A1* 12/2018  Sharma ................ B60R 13/105

* cited by examiner

IRRADIATION MARKING OF RETROREFLECTIVE SHEETING

The present application relates generally to methods of marking retroreflective sheeting. The present application more specifically relates to methods for irradiation marking prismatic sheeting.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits the same light return regardless of orientation, i.e., when rotated about an axis normal to the surface of the sheeting. For this reason, it is said that the distribution of light returned by beaded retroreflective sheeting is generally rotationally symmetric. Thus when viewing or measuring the coefficient of retroreflection (expressed in units of candelas per lux per square meter or Ra) at presentation angles from 0 to 360 degrees, or when measuring at orientation angles from 0 to 360, there is relatively little variation in the retroreflectivity of beaded sheeting. For this reason, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element. Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae. These microreplication processes produce a retroreflective sheeting with prismatic structures that have been precisely and faithfully replicated from a microstructured tool having a negative image of the desired prismatic structure.

Prismatic retroreflective sheeting, in contrast to beaded retroreflective sheeting, is generally rotationally non-symmetric. Thus when viewing or measuring Ra at presentation angles from 0 to 360 degrees, or when measuring at orientation angles from 0 to 360, there is significant variation in the retroreflectivity of prismatic sheeting. For this reason, prismatic sheeting has a higher sensitivity to the orientation at which the sheeting is placed on a surface than beaded sheeting.

Modification of prismatic sheeting by canting cubes is described, for example, in U.S. Pat. No. 4,588,258 (Hoopman). When the cubes along one groove are canted, retroreflectivity generally increases at larger entrance angles along an axis perpendicular to that groove. Retroreflectivity tends to decrease at larger entrance angles at orientations that are not close to the axis perpendicular to that groove. Thus canted sheeting tends to have increased variation in retroreflectivity at a given orientation angle. For this reason, canted sheeting is especially rotationally non-symmetric.

As is stated in U.S. Patent Publication No. 2009/0142486 (Hannington), "a demand exists for retroreflective materials having discernible patterns, graphics, or validation images formed thereon." Beaded sheeting having specific graphic images or marks has been used on license plates to act as a means of verifying the authenticity or valid issuance of the license plate. For example, license plates in Washington, D.C. have generally included an identifying mark imprinted in reflective sheeting since 1986. The security mark is round and appears in a repeating pattern down the center of the license plate (as evident from http://dcplates.com/Glossary.htm). The security mark can be seen clearly only when the plate is viewed at a 30 degree angle, and the mark is placed in the sheeting by its manufacturer for control purposes during the production process.

Another security mark for use on license plates using beaded sheeting is described, for example, in U.S. Pat. No. 7,068,434 (Florczak et. al.). This security mark is formed in beaded sheeting as a composite image that appears to be suspended above or below the sheeting. Because of its appearance, this type of security mark is generally referred to as a floating image.

Other types of beaded sheeting including security marks include those described, for example, in U.S. Patent Publication No. 2009/0142486 (Hannington) (relating to the inclusion of a layer of transparent microsphere lenses embedded in a spacing layer to form an image) and U.S. Pat. No. 4,634,220 (Hockert) (relating to laser irradiation of the back surface of the sheeting to form an image).

SUMMARY

Methods for creating normally invisible or nearly invisible marks on retroreflective prismatic sheeting that can be seen when viewed with coaxial or nearly coaxial illumination, such as a retroviewer are disclosed. The methods include applying an irradiation source to the prismatic side of the retroreflective prismatic sheeting to form a mark in the prismatic side of the retroreflective prismatic sheeting.

The disclosed method can produce retroreflective prismatic sheeting that can be used in a variety of applications such as security features, validation marks, homologation marks, or other signage, for example.

In some embodiments a method of marking prismatic retroreflective sheeting includes providing prismatic retroreflective sheeting having a front side and a back side, the back side having prismatic features and directing a radiation source at the back side of the prismatic retroreflective sheeting and irradiating a plurality of the prismatic features. The radiation forms a mark in the prismatic retroreflective sheeting.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
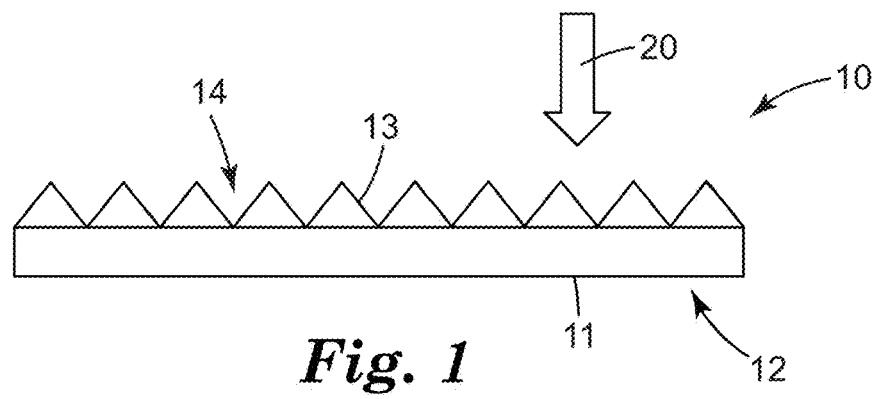
FIG. 1 is a schematic cross-sectional view of prismatic retroreflective sheeting and arrow pointing to cube corner elements and representing a radiation source.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Preferred security features are difficult to copy by hand or by machine and/or are manufactured using secure and/or difficult to obtain materials.

The term "security mark" refers to an element on or in a prismatic film that is surrounded by a background visual appearance. In many embodiments the security mark is an "island" feature surrounded by a continuous background appearance. The security mark can change appearance to a viewer as the viewer changes their point of view of the security mark.

The present disclosure relates to methods for creating normally invisible or nearly invisible marks on retroreflective prismatic sheeting that can be seen when viewed with coaxial or nearly coaxial illumination, such as a retroviewer. In particular, the present disclosure relates to applying an irradiation source to the prismatic side of the retroreflective prismatic sheeting to form a mark in the prismatic side of the retroreflective prismatic sheeting. The radiation source (e.g., laser) irradiates a plurality of cube corner elements and changes the shape of the cube corner elements or flatness of the faces of the cube corner elements to affect the light reflection properties of the affected area. The disclosed methods can produce retroreflective prismatic sheeting that can be used in a variety of applications such as security features, validation marks, homologation marks, or other signage, for example. While the present disclosure is not so limited, an appreciation of various aspects of the disclosure will be gained through a discussion of the examples provided below.

Cube corner sheeting, sometimes referred to as prismatic sheeting typically includes a multitude of cube corner elements to retroreflect incident light. Cube corner retroreflectors can include a sheet having a generally planar front surface (i.e., front side) and an array of cube corner elements protruding from the back surface (i.e., back side). Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. The light rays are typically reflected at the lateral faces due to total internal reflection, or by reflective coatings, as previously described, on the back side of the lateral faces. Preferred polymers for cube corner sheeting include poly (carbonate), poly(methylmethacrylate), poly(ethyleneterephthalate), aliphatic polyurethanes, as well as ethylene copolymers and ionomers thereof. Cube corner sheeting may be prepared by casting directly onto a film (body layer), such as described in U.S. Pat. No. 5,691,846 (Benson). Preferred polymers for radiation cured cube corners include cross linked acrylates such as multifunctional acrylates or epoxies and acrylated urethanes blended with mono- and multifunctional monomers. Further, cube corners such as those previously described may be cast on to plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

Prismatic retroreflective sheeting can be manufactured as an integral material, e.g., by embossing a preformed sheet with an array of cube corner elements or by casting a fluid material into a mold. Alternatively, retroreflective sheeting can be manufactured as a layered product by casting the cube corner elements against a preformed film or by laminating a preformed film to preformed cube corner elements. The cube corner elements can be formed on a polycarbonate film approximately 0.5 mm thick having an index of refraction of about 1.59. Useful materials for making retroreflective sheeting are preferably materials that are dimensionally stable, durable, weatherable, and readily formable into the desired configuration. Generally any optically transmissive material that is formable, typically under heat and pressure, can be used. The sheeting can also include colorants, dyes, UV absorbers or separate UV absorbing layers, and other additives as needed. A backing layer sealing the cube corner elements from contaminants can also be used, together with an adhesive layer.

The term "sheeting" generally refers to articles which have a thickness on the order of about 1 mm or less and which in large samples can be wound tightly into a roll for ease of transportation.

FIG. 1 is a schematic cross-sectional view of prismatic retroreflective sheeting 10 and arrow 20 pointing to cube corner elements 13 and representing a radiation source. The prismatic retroreflective sheeting has a front side 12 and a back side 14. The back side 14 includes prismatic features 13. The front side 12 includes a body layer 11. In many embodiments the prismatic features 13 are cube corner elements that retroreflect incident light, as described above. Incident light can transmit through the front side 12 (and in many embodiments is a planar surface) and retroreflect at the back side 14. In some embodiments the prismatic retroreflective sheeting includes a light reflecting coating such as a metallic vapor coat, for example.

A radiation source 20 is directed at the back side 14 of the prismatic retroreflective sheeting 10 and irradiating a plurality of the prismatic features 13. The radiation 20 forms a mark in the prismatic retroreflective sheeting 10. In some embodiments the prismatic retroreflective sheeting includes a light reflecting coating such as a metallic vapor coat prior to being irradiated with the radiation source 20.

The mark can be any useful mark for example, a shape, figure, symbol, design, letter, number, alphanumeric character, or indicia. The mark can be formed with the radiation source 20 by any useful method. For example, the mark can be directly "written" with the radiation source or the mark can be formed by directing the radiation source through a mask. The resulting marked prismatic retroreflective sheeting can then be further processed by placing reflective coating (if needed) adhesives and release liners on the marked prismatic retroreflective sheeting. In some embodiments, a reflective layer (e.g., metallic coating) is disposed on the prismatic sheeting prior to being irradiated with the radiation source 20. The marked prismatic retroreflective sheeting can be utilized to form signage and elements for license plates, for example.

The radiation source 20 can be any useful radiation source such as a laser. In some embodiments the radiation source 20 is an ultraviolet laser. In some embodiments the radiation source 20 is an infrared laser. In some embodiments the radiation source 20 is a visible light laser.

The radiation source 20 strikes a plurality of prismatic features 13 (e.g., cube corner elements) at the same time. While not wishing to be bound to any particular theory, one exemplary theory is that irradiation of the prismatic features alters the structure of the irradiated cubes or the flatness of the faces of the cubes (e.g. through introduction of disturbances on the faces of the cubes). The distribution of light reflected from the altered prismatic features is different from the distribution of light reflected from the non-irradiated prismatic features. As a result, at some combinations of viewer and light source positions, the altered prismatic features return a different amount of light to the viewer, appearing darker or lighter than the non-altered prismatic features.

In some embodiments the altered prismatic features may result from a change in the structure of the cubes, such as a change in the dihedral angle between one or more pairs of cube corner faces, or a change in the sharpness of cube vertices. In other embodiments the altered prismatic features may result from a change in the flatness of cube faces, such as a change in roughness.

The retroreflective sheeting of the present application has certain unique optical features. One way of measuring these unique optical features is measuring total light return. Predicted total light return for a cube corner matched pair array may be calculated from a knowledge of percent active area and ray intensity. Total light return is defined as the product of percent active area and ray intensity. Another way of measuring these unique optical features of the sheeting of the present application involves measuring fractional retroreflectance (% RT) and fractional retroreflectance slope (% RT slope) of the prismatic features, as described in Driver-Focused Design of Retroreflective Sheeting For Traffic Signs (by Smith, K., Transportation Research Board 87th Annual Meeting: Compendium of Papers DVD, Washington D.C. 2008).

In the embodiments where the flatness of the cube faces are altered, incident light may scatter or shift to high observation angles, depending on the size and frequency of the disturbances. One example of disturbances that change the return light distribution is contemplated in the literature, as described, for example, in PCT Application No. WO9630786 to Nilsen. One example of disturbances that cause light to scatter, therefore resulting in a fairly uniform decrease in total light return over all observation angles is described in U.S. Patent Application No. 61/107,586 to Smith.

In the embodiments where the structure of the prismatic features is altered, the divergence profile of the retroreflected light (i.e., the distribution of light with respect to observation angle) is changed. Light retroreflected from the altered prismatic features will shift from low to high observation angles.

Figure 2:
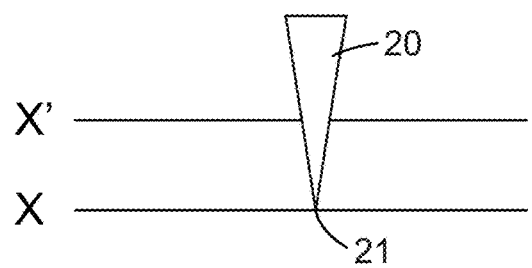
FIG. 2 is a schematic diagram of a laser beam with focal point and positioning of the prismatic film sample.

FIG. 2 is a schematic diagram of a laser beam 20 with focal point 21 and positioning of the prismatic film sample. In many embodiments, the prismatic retroreflective sheeting is positioned above (closer to the radiation source) the focal point 21 of the laser beam 20. The focal point plane is labeled "X". A plane above the focal point plane is labeled "X'". The prismatic retroreflective sheeting can be positioned along the plane labeled "X'". This allows the laser beam 20 to contact and irradiate a plurality of prismatic features at the same time. At the plane labeled "X'" the laser beam can be described as being "out-of-focus". The specific positioning of the processing plane X' and settings of laser power and laser beam size are not meant to be limited by these descriptions. Those with skill in the art will recognize that other combinations of these parameters can be made without departing from the scope this invention.

EXAMPLES

Method of Making Prismatic Retroreflective Sheeting

Prismatic retroreflective sheeting was prepared as generally described in U.S. Patent Publication No. 2007/0242356, incorporated herein by reference.

A body layer was prepared by casting an ethylene-acrylic acid copolymer resin (commercially available under the trade designation "Primacor 3440" from Dow Chemical Company, Mich., USA) as a film at a thickness of 2.5 mils (0.006 cm) onto a polyethylene terephtalate (PET) carrier prepared using the extrusion process described in the First Construction of Examples 1-5 of U.S. Patent Publication No. 2007/0242356 to Thakkar. The EAA surface was corona treated at an energy of about 1.5 J/cm$^2$.

Cube corner microstructures were provided on the body layer. The cube corner microstructures were formed from a tooling having 3 sets of intersecting grooves, as generally described in U.S. Pat. No. 6,843,571 to Sewall. The tooling had a pitch (i.e., primary groove spacing) of 0.0032 in (0.08 cm) with base triangle apertures of 61, 61 and 58 degrees resulting in the height of the cube corner elements being 37.6 microns (1.48 mil).

The cube corner microstructures were prepared using a resin composition formed by combining 25 wt-% bisphenol A epoxy diacrylate, commercially available from Cytek under the trade designation "Ebecryl 3720", 12 wt-% dimethylaminoethyl acrylate ("DMAEA"), 38 wt-% TMPTA (trimethylol propane triacrylate) and 25 wt-% 1,6 HDDA (hexanediol diacrylate). The formulation had 0.5 pph of 2,4,6-trimethylbenzoyl diphenylphosphine oxide (commercially available under the trade designation "Lucirin TPO" from BASF, N.C., USA) photoinitiator.

The resin composition was cast at room temperature at 25 fpm onto a metal tool heated to 74 degrees centigrade. The resin composition filled the cavities of the cube corner microstructures in the tool via a rubber nip roller having a gap set to fill the cavities of the embossed pattern on the tool and minimize the amount of resin on the land area of the tool. The corona treated layer of the EAA film/PET carrier was brought into contact with the cube corner microstructures of the resin. The cube corner microstructure resin was cured through the PET carrier/EAA film/primer on the tool with one Fusion D UV lamp (available from Fusion Systems, Rockville, Md.) set at 360 W/in. Dichroic filters were used in front of the UV lamps to minimize IR heating of the construction. After curing of the cube corner microstructures on the tool, the composite was removed from the tool and the polymerizable resin side of the composite with the cube corner elements was irradiated by a Fusion D UV lamp operating at 600 W/in to provide a post-UV irradiation cure. The composite was passed through an oven set at 121 degrees centigrade to relax the stresses in the film.

Samples of the prismatic retroreflective sheeting were used in Examples 1-4.

Method of Making Vapor Coated Prismatic Retroreflective Sheeting

A metalized prismatic retroreflective sheeting was prepared by vapor-depositing an aluminum film of 1000 Å thickness over the cube corner elements such as generally described in Example 1 of U.S. Pat. No. 5,691,846 to Benson. A sample of the metalized prismatic retroreflective sheeting was used in Example 5.

Example 1

A 28 cm long and 18 cm wide sample of the prismatic retroreflective sheeting was placed on a surface below a two-dimensional laser scanner (model "XLR8-15 mm", available from Nutfield Technology, N.H., USA) with the back side of the prismatic retroreflective sheeting facing towards the scanner. The laser scanner was controlled by a computer software interface ("Waverunner Laser and Scanner Control Software", available from Nutfield Technology). In this setting, the working distance from the scanner to the focal point plane ("X") was of approximately 400 mm, where the diameter of the laser beam was approximately 250 micrometers. The surface where the sample was placed thereon (plane "X'") was located 76 mm above the focal point plane, where the diameter of the laser beam was approximately 1000 micrometers. The sample of the prismatic retroreflective sheeting was exposed by a first scanning method wherein the laser beam was directed by the scanner mirrors across the surface of the prismatic retroreflective sheeting using vector paths to create a 12 mm high by 20 mm wide mark in the shape of the letters "US". A $CO_2$ laser source with 10.6 micrometer wavelength, a quasi-continuous output power of 41 Watts and a pulse repetition rate of 20 kHz (model "Diamond C-55A" available from Coherent, Calif., USA) was directed into the scanner. The speed of the moving beam along the path was approximately 2000 mm/s.

Example 2

Figure 3A:
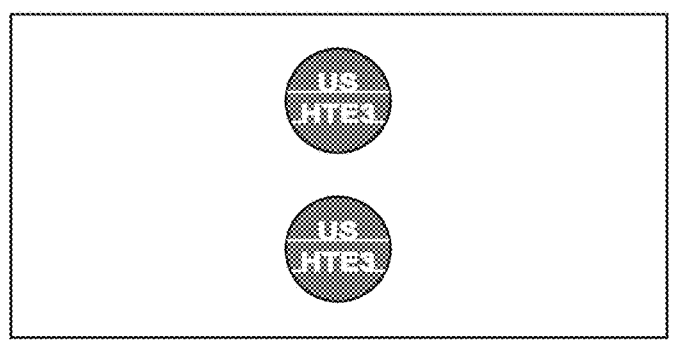
FIG. 3a is a schematic diagram of a direct area exposed (US HTE3) mark appearing dark.
Figure 3B:
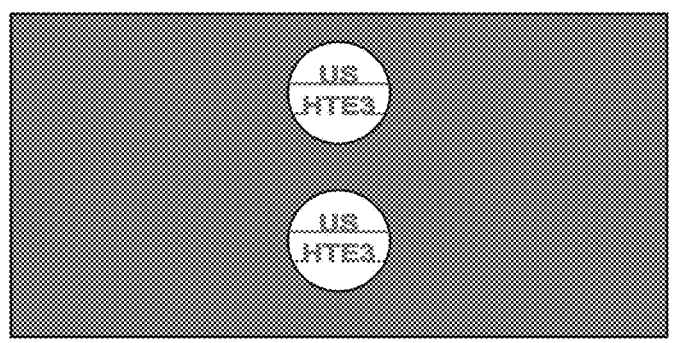
FIG. 3b is a schematic diagram of a direct area exposed (US HTE3) mark appearing light.

A 28 cm long and 18 cm wide sample of the prismatic retroreflective sheeting was exposed to the laser beam and conditions described in Example 1, except that the prismatic retroreflective sheeting was exposed by a second scanning method. In this method a stencil mask was made using a standard sheet of 20 lb (9 kg) paper (such as available under the trade designation "Hammermill Great White Copy" from International Paper, Tenn., USA). The stencil mask comprised a 32 mm diameter circle with included alphanumeric character sets. A first set horizontally centered in the circle and located on its upper half portion comprised a 17 mm wide and 8 mm high pattern in the shape of the characters "US". A second set horizontally centered in the circle and located on its bottom half portion was provided with a 20 mm wide and 6 mm high pattern in the shape of the characters "HTE3". The stencil mask was placed on the back side of the prismatic retroreflective sheeting. The laser beam was directed in a sequence of horizontal parallel paths (also commonly known as raster scanning), wherein the parallel paths were displaced from each other by approximately 1.25 mm. A mark was formed on the prismatic retroreflective sheeting by adjusting the size of the scanned area to completely expose the stencil mask area. FIG. 3a is a schematic diagram of a direct area exposed (US HTE3) mark appearing dark from a first observation angle and FIG. 3b is a schematic diagram of a direct area exposed (US HTE3) mark appearing light from a second observation angle.

Example 3

A 28 cm long and 18 cm wide sample of the prismatic retroreflective sheeting was placed on a surface below a galvoscanner (model "HPLK 4120", available from GSI Group, Mass., USA) with the back side of the prismatic retroreflective sheeting facing towards the scanner. The scanner was controlled by the computer software of Example 1. A $Nd:YVO_4$ laser source with a 355 nm wavelength, a pulsed output power of 1.5 Watts and a pulse repetition rate of 20 kHz (model "Avia 355-3000" available from Coherent) was directed into the scanner. In this setting, the working distance from the scanner to the focal point plane ("X") was of approximately 330 mm, where the diameter of the laser beam was approximately 40 micrometer. The surface where the sample was placed thereon (plane "X'") was located 27 mm above the focal point plane, where the diameter of the laser beam was approximately 500 micrometers. A mark was formed on the sample of the prismatic retroreflective sheeting using the first scanning method and the pattern described in Example 1, except that the speed of the moving beam along the path was of approximately 135 mm/s.

Example 4

A 28 cm long and 18 cm wide sample of the prismatic retroreflective sheeting was exposed to the laser beam and conditions described in Example 3, except that the surface where the sample was placed thereon (plane "X'") was located 55 mm above the focal point plane, where the diameter of the laser beam was approximately 1000 micrometers. A mark was formed on the prismatic retroreflective sheeting using the second scanning method and the pattern described in Example 2, except that the sequence of parallel paths was provided at an angle of 45 degrees relative to the horizontal, and the parallel paths were displaced from each other by approximately 1 mm. The speed of the moving beam along the path was of approximately 145 mm/s. The size of the scanned area was adjusted to completely expose the mask area.

Example 5

A 28 cm long by 18 cm wide sample of the metallized prismatic retroreflective sheeting was exposed to the laser beam and conditions described in Example 4, except that the surface where the sample was placed thereon (plane "X") was located 55 mm above the focal point plane, where the diameter of the laser beam was approximately 1000 micrometer. A mark was formed on the prismatic retroreflective sheeting using the second scanning method and the pattern described in Example 4, wherein the sequence of parallel paths at an angle of 45 degrees relative to the horizontal were displaced from each other by approximately 0.75 mm. The speed of the moving beam along the path was of approximately 60 mm/s. The size of the scanned area was adjusted to completely expose the mask area.

In samples prepared as described in Examples 1 through 5, the laser exposed areas (marks) appeared dark when viewed under retroreflection (with the aid of a retroviewer (commercially available from 3M Company)) and at small observation angles, regardless of the scanning method used to produce the samples. The dark mark provided a visual contrast with the nominally bright background of the retroreflective sheeting, as shown in FIG. 3a. Under diffuse light the mark appeared nearly invisible.

It was also observed that under retroreflection and with increased observation angles (observation angles of approximately 2.5 degrees or higher), the mark changed from appearing dark against a bright background to appearing light against a dark background, as shown in FIG. 3b.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present application will become apparent to those skilled in the art without departing from the spirit and scope of the invention. The scope of the present application should, therefore, be determined only by the following claims.

What is claimed is:

1. A prismatic retroreflective sheeting comprising:
   a front side; and
   a back side including a first set of cube corner elements having a first property, and a second set of the cube corner elements have a second property, different from the first property;
   wherein the first set of cube corner elements form a normally nearly invisible mark that can be seen when viewed with coaxial illumination.

2. The prismatic retroreflective sheeting of claim 1, wherein the first property and the second property are one of dihedral angle, sharpness of cube vertices, and roughness.

3. The prismatic retroreflective sheeting of claim 1, wherein the mark is selected from a group consisting essentially of a shape, figure, symbol, design, letter, number, alphanumeric character, and indicia.

4. The prismatic retroreflective sheeting of claim 1, further comprising one of a seal film or reflective coating adjacent the cube corner elements.

5. An article comprising the prismatic retroreflective sheeting of claim 1.

6. The article of claim 5, wherein the article is one of a license plate or a signage.

* * * * *